(12) United States Patent
Van Den Enden et al.

(10) Patent No.: US 8,619,530 B2
(45) Date of Patent: *Dec. 31, 2013

(54) WRITING DEVICE, RECORD CARRIER AND METHOD OF WRITING INFORMATION BLOCKS, AND READING DEVICE FOR READING INFORMATION BLOCKS

(75) Inventors: Gusbert J. Van Den Enden, Eindhoven (NL); Antonius P. G. E. Janssen, Eindhoven (NL); Arnoldus J. Niessen, Eindhoven (NL); Cornelis Teunissen, Eindhoven (NL); Franz H. U. Frank, Eindhoven (NL)

(73) Assignee: Koninklijke Philips N.V., Eindhoven (NL)

( * ) Notice: Subject to any disclaimer, the term of this patent is extended or adjusted under 35 U.S.C. 154(b) by 0 days.

This patent is subject to a terminal disclaimer.

(21) Appl. No.: 12/570,401

(22) Filed: Sep. 30, 2009

(65) Prior Publication Data
US 2010/0014404 A1   Jan. 21, 2010

Related U.S. Application Data

(63) Continuation of application No. 10/376,218, filed on Feb. 27, 2003, now Pat. No. 7,616,546, which is a continuation of application No. 09/589,482, filed on Jun. 7, 2000, now Pat. No. 6,549,489, which is a continuation of application No. 08/972,756, filed on Nov. 18, 1997, now Pat. No. 6,151,281.

(30) Foreign Application Priority Data

Nov. 18, 1996 (EP) ..................... 96203218
Nov. 26, 1996 (EP) ..................... 96203285
Mar. 14, 1997 (EP) ..................... 97200761

(51) Int. Cl.
*G11B 7/00* (2006.01)

(52) U.S. Cl.
USPC ................. 369/53.24; 369/275.3; 369/30.11

(58) Field of Classification Search
USPC ............ 369/53.24, 53.2, 53.41, 275.3, 30.11, 369/30.27, 47.1, 47.15, 44.26, 32.01, 33.01, 369/30.1
See application file for complete search history.

(56) References Cited

U.S. PATENT DOCUMENTS

| | | |
|---|---|---|
| 4,901,300 A | 2/1990 | Van Der Zande et al. |
| 5,177,720 A | 1/1993 | Kondo |

(Continued)

FOREIGN PATENT DOCUMENTS

| | | |
|---|---|---|
| EP | 0552986 A2 | 1/1993 |
| EP | 0552986 A2 | 7/1993 |

(Continued)

*Primary Examiner* — Tan X Dinh

(57) ABSTRACT

Reading a partly written writable record carrier having a track structure for positioning the write head above unwritten areas of the track pattern by means of a reading device which positions the read head on the basis of written marks, yields problems when an isolated information block after an unwritten area must be read. A system is disclosed for writing and reading information blocks on a record carrier of a writable type such as a CD-RW or a DVD-RAM. The writing device is provided with status means for generating status information which is indicative of the fact that at least one area of the record carrier has been written, while the status information comprises initial-area information which is indicative of an uninterrupted written initial area which extends from the start of a track pattern area intended for writing information blocks. The status information can be fixed on the record carrier. A reading device is also described, in which the positioning is dependent on the status information. Reading instructions with addresses outside the initial area can be rejected or translated via an address translation table into addresses in the initial area.

40 Claims, 7 Drawing Sheets

(56) References Cited

U.S. PATENT DOCUMENTS

| | | |
|---|---|---|
| 5,187,699 A | 2/1993 | Raaymakers et al. |
| 5,210,734 A | 5/1993 | Sakurai |
| 5,341,356 A | 8/1994 | Dieleman et al. |
| 5,390,159 A | 2/1995 | Schylander |
| 5,430,698 A | 7/1995 | Nonaka et al. |
| 5,471,441 A | 11/1995 | Nonaka et al. |
| 5,508,988 A | 4/1996 | Nonaka et al. |
| 5,559,778 A | 9/1996 | Inokuchi et al. |
| 5,661,703 A | 8/1997 | Moribe et al. |
| 5,721,856 A | 2/1998 | Takeuchi |
| 5,737,290 A | 4/1998 | Ohmori |
| 5,745,459 A | 4/1998 | Inokuchi et al. |
| 6,151,281 A * | 11/2000 | Van Der Enden et al. . 369/30.11 |
| 6,208,602 B1 | 3/2001 | Franz |
| 6,359,844 B1 | 3/2002 | Franz |
| 6,549,489 B1 * | 4/2003 | Van Der Enden et al. . 369/30.11 |
| 6,580,682 B1 | 6/2003 | Kamperman et al. |
| 6,671,243 B2 | 12/2003 | Ando et al. |
| 2007/0053267 A1 | 3/2007 | Brondijk |
| 2007/0291627 A1 * | 12/2007 | Park .......................... 369/275.3 |

FOREIGN PATENT DOCUMENTS

| | | |
|---|---|---|
| EP | 0557717 A2 | 9/1993 |
| EP | 0617358 A1 | 9/1994 |
| EP | 0690369 A2 | 1/1996 |
| JP | 2299036 A | 12/1990 |
| JP | 3086975 A | 4/1991 |
| JP | 5089596 A | 4/1993 |
| JP | 5217288 A | 8/1993 |
| JP | 8045246 A | 2/1996 |
| JP | 9265630 A | 10/1997 |
| JP | 10143980 A | 5/1998 |

* cited by examiner

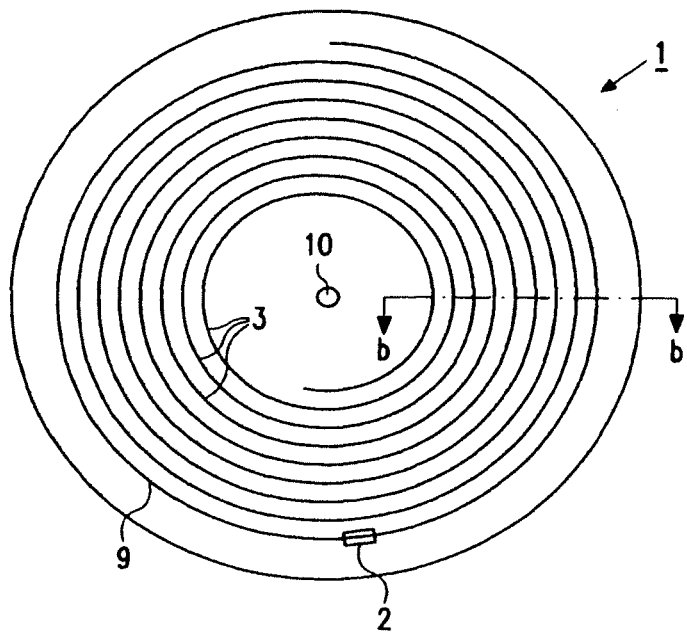
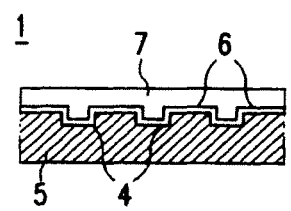
FIG. 1b
FIG. 1a
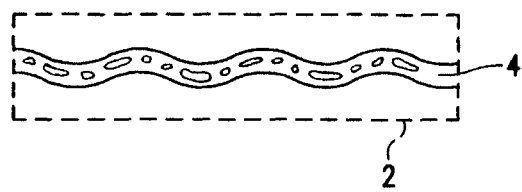
FIG. 1c
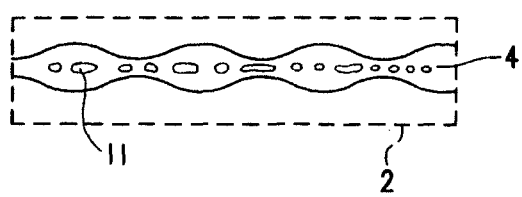
FIG. 1d

WRITING DEVICE, RECORD CARRIER AND METHOD OF WRITING INFORMATION BLOCKS, AND READING DEVICE FOR READING INFORMATION BLOCKS

This application is a continuation of prior application Ser. No. 10/376,201 filed Feb. 27, 2003, now U.S. Pat. No. 7616546 which is a continuation of application Ser. No. 09/589,482 filed Jun. 7, 2000, now U.S. Pat. No. 6,549,489 whis is a continuation of application Ser. No. 08/972,756 filed Nov. 18, 1997, now U.S. Pat. No. 6,151,281 which claimed foreign priority of EP 96203218.1 filed Nov. 18, 1996 and EP 96203285.0 filed Nov. 26, 1996 and EP 9720761 filed Mar. 14, 1997.

DESCRIPTION

The invention relates to a device for writing information blocks in a track pattern on a record carrier of a writable type, which device is provided with a write unit for writing areas of the record carrier via a beam of electromagnetic radiation with marks representing the information blocks, and positioning means for positioning the write unit on the record carrier on the basis of a track structure which is indicative of the track pattern.

The invention also relates to a writable record carrier having a track pattern for writing information blocks, and a track structure which is indicative of the track pattern.

The invention also relates to a method of writing information blocks in a track pattern on a record carrier of a writable type, in which method marks representing the information blocks are written in areas of the record carrier via a write unit and a beam of electromagnetic radiation, the write unit being positioned on the basis of a track structure which is indicative of the track pattern.

The invention also relates to a reading device provided with read means for reading information blocks represented by optically readable marks in a track pattern on a record carrier, said device being provided with a read unit for reading the marks via a beam of electromagnetic radiation, and positioning means for positioning the read unit on the basis of the marks.

A writing device, a method and a record carrier of the type described in the opening paragraph for writing information blocks are known from U.S. Pat. No. 4,901,300 (PHN 12.398). In the system described in this document, information blocks are written in a track pattern on the record carrier and represented by optically readable marks. The record carrier has a track structure in the form of a wobbling pregroove with a varying frequency which represents position information. The writing device has a write head for scanning the record carrier via a beam of electromagnetic radiation, with tracking signals being derived from reflected radiation, and positioning means for positioning the write head during scanning on the basis of the position information. During scanning, a modulation in the tracking signals is produced by the wobble. This modulation comprises the position information encoded therein, indicating the absolute position in the track with respect to the starting point of the area intended for information. The information blocks are written on the record carrier at a desired position in conformity with their address, while, if necessary, the write head is positioned via a jump in the track on the basis of the position information. A record carrier may be partly written and then comprises written areas in which marks are present, and unwritten areas in which only the track structure is present. Reading devices are known which derive the tracking signals and/or position information from the marks. A problem of these reading devices is that no position information can be generated in unwritten areas, so that a partly written record carrier is not reliably readable.

It is an object of the invention to provide means with which a partly written record carrier can be read in a more reliable manner.

In accordance with a first aspect of the invention, a writing device as described in the opening paragraph is therefore characterized in that the device is provided with status means for generating status information which is indicative of the fact that at least one area of the record carrier has been written, the status information comprising initial-area information which is indicative of an uninterrupted written initial area which extends from the start of a track pattern area intended for writing information blocks.

In accordance with a second aspect of the invention, a record carrier as described in the opening paragraph is characterized in that the record carrier is provided with status information which is indicative of the fact that at least one area of the record carrier has been written, the status information comprising initial-area information which is indicative of an uninterrupted written initial area which extends from the start of a track pattern area intended for writing information blocks.

In accordance with a third aspect of the invention, a method as described in the opening paragraph is characterized in that status information is generated which is indicative of the fact that at least one area of the record carrier has been written, the status information comprising initial-area information which is indicative of an uninterrupted written initial area which extends from the start of a track pattern area intended for writing information blocks.

In accordance with a fourth aspect of the invention, a reading device as described in the opening paragraph is characterized in that the positioning means are adapted to position in dependence upon status information which is indicative of the fact that at least one area of the record carrier has been written, the status information comprising initial-area information which is indicative of an uninterrupted written initial area which extends from the start of a track pattern area intended for writing information blocks.

The inventive measures have, inter alia, the advantage that the reading device only needs to be adapted in a limited way and does not need to be provided with complex means for regaining position information on the basis of the track structure.

An embodiment of the writing device according to the invention is characterized in that the device is provided with rewriting means for rewriting, contiguously to the initial area, information blocks which are isolated from the initial area. This has the advantage that the isolated information blocks can be read with a simple, standard reading device because a copy is available within the initial area.

An embodiment of the reading device according to the invention is characterized in that the positioning means are adapted to reject instructions for positioning outside the initial area. This has the advantage that the reading device prevents the read head from reaching an unwritten area whereby the reading device would come in an undefined state.

These and other aspects of the invention are apparent from and will be elucidated with reference to the embodiments described hereinafter.

In the drawings:

FIG. 1 shows a record carrier having a track structure,

In the Figures, elements corresponding to those elements already described have the same reference numerals.

FIG. 6 shows additional details of the positioner of FIG. 4.

FIG. 7 shows additional details of the system drive unit of FIG. 4.

FIG. 8 shows a network for implementing the invention.

Figure 2:
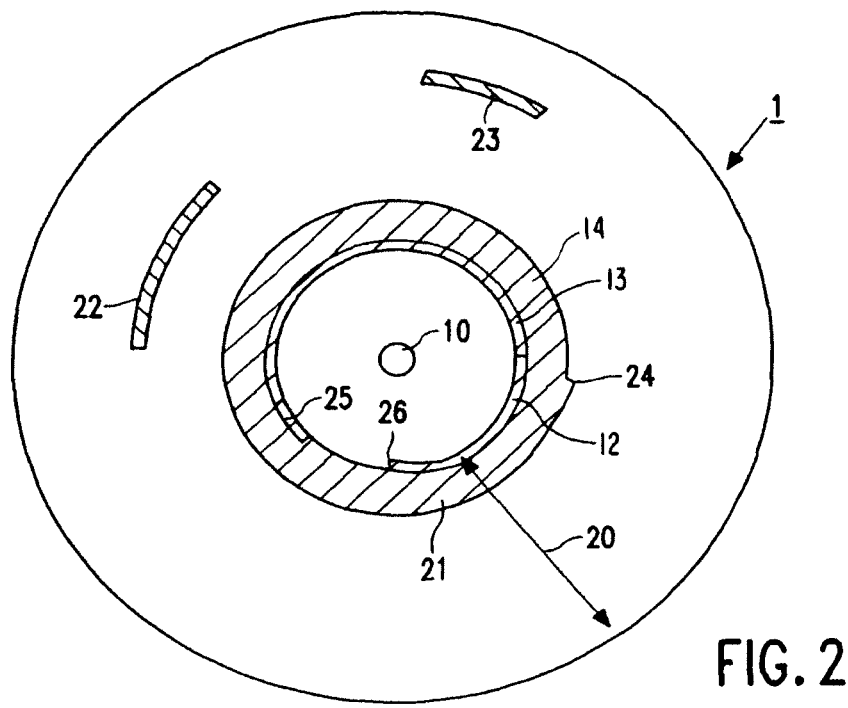
FIG. 2 shows a partly written record carrier with status information.

FIG. 1a shows a disc-shaped record carrier 1 having a track 9 intended for writing and a central aperture 10. The track 9 is arranged in accordance with a spiral pattern of turns 3. The track 9 is indicated on the record carrier by a track structure provided during manufacture of the blank record carrier. FIG. 1b shows a cross-section taken on the line b-b of the record carrier 1, in which a transparent substrate 5 is provided with a recording layer 6 and a protective layer 7. The track structure is constituted, for example by a pregroove 4 which enables a write head to follow the track 9 during scanning. The pregroove 4 may be implemented as an indentation or an elevation, or as a material property different from its surroundings. The track structure may also consist of an alternation of elevated and deeper turns, referred to as land and groove patterns, with a transition from land to groove or vice versa taking place per turn. The recording layer 6 may be optically or magneto-optically writable by means of a device for writing information such as the known CD-Recordable. The information is organized in information blocks and is represented by optically readable marks in the form of a succession of areas reflecting large and small quantities of radiation such as, for example a succession of pits of different lengths in a CD. Such a writable disc is provided in the system of the novel high density optical disc, the Digital Versatile Disc (DVD) and is referred to as DVD-RAM. FIGS. 1c and 1d show two examples of a periodical modulation (wobble) of the pregroove. This wobble produces an extra signal in a tracking servorecorder. The wobble is, for example frequency-modulated and position information such as an address or a time code is encoded in the modulation. A writable CD system which is provided with position information in this way is described in U.S. Pat. No. 4,901,300 (PHN 12.398) and U.S. Pat. No. 5,187,699 (PHQ 88.002). A track structure may also consist of, for example regularly divided sub-patterns which periodically produce tracking signals. Other examples of track structures are header symbols formed by optically readable marks which are indicative of an address and indicate the initial area for writing an information block. This description is based on information storage in a spiral track pattern which is filled from the inside outwards, for example as in a CD-ROM. The invention is also applicable to other track patterns in which the turns are arranged concentrically instead of spirally, or to record carriers of different shapes such as optical tapes.

FIG. 2 shows diagrammatically a partly written disc-shaped record carrier 1 provided with status information 25 according to the invention. The area intended for information storage is indicated by an arrow 20 in a radial direction, the information being written from the inside outwards and the position information in the track structure comprising, for example addresses ascending from the center. From the start 26 of the area 20 intended for information storage, an initial area 21 is uninterruptedly written with, for example a lead-in area, file management information and user information up to an end 24. The file management information comprises, for example directories and path tables as known from ISO 9660. Moreover, second and third written areas 22 and 23 are shown, which are isolated from the initial area 21 and are used for storing user information. It is true that the record carrier 1 has a track structure as described with reference to FIG. 1, but in a standard reading device it is not usable for positioning when the standard reading device derives the tracking and/or position information on the basis of marks. The entirely written area 21 will be readable in each reading device because marks are uninterruptedly present from a radius to be minimally used (for the relevant record carrier type). However, when such a standard reading device must read the isolated areas 22 or 23, for example addressed via a read command, this device will displace a read head via a jump to a radial position corresponding to the address. However, since there are no marks, a standard device will not be able to position the read unit and reproduce no information so that it may come in an undefined state. If the track structure comprises headers which are formed by marks, the standard reading device will, in principle, be able to read them. However, due to the absence of intermediate marks in unwritten areas, the read unit cannot be positioned correctly above the track and tracking and read means cannot correctly respond. Consequently, reading of the headers in an unwritten area is unreliable. According to the invention, the record carrier is provided with status information 25. This status information indicates that given areas on the record carrier are written and is stored in a predetermined way, for example in a given part of the lead-in area or in the file management information. A reading device according to the invention, as further described with reference to FIG. 5, can read and process the status information. The status information is further described with reference to the writing device shown in FIG. 4. In the conventional types of rewritable optically readable record carriers provided with phase-change material, the marks once written remain present and it is not common practice to use an erasing procedure to restore the record carrier to its blank, unwritten state again. If the invention is used for a type of record carrier in which such an erasing procedure is used, the status information should of course be adapted accordingly.

Figure 3A:
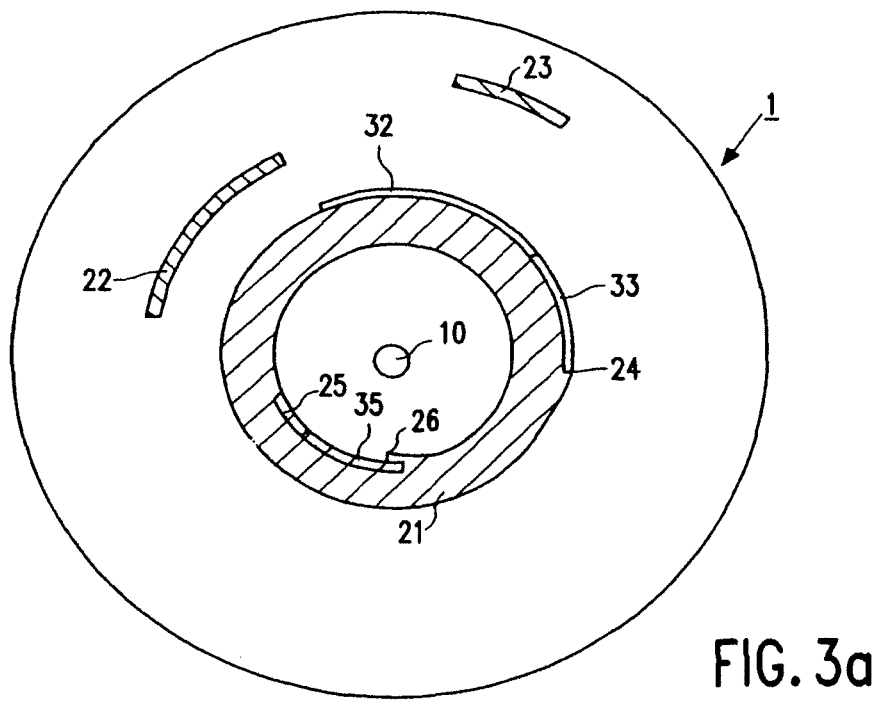
FIG. 3 shows a partly written record carrier with rewritten information blocks.
Figure 4:
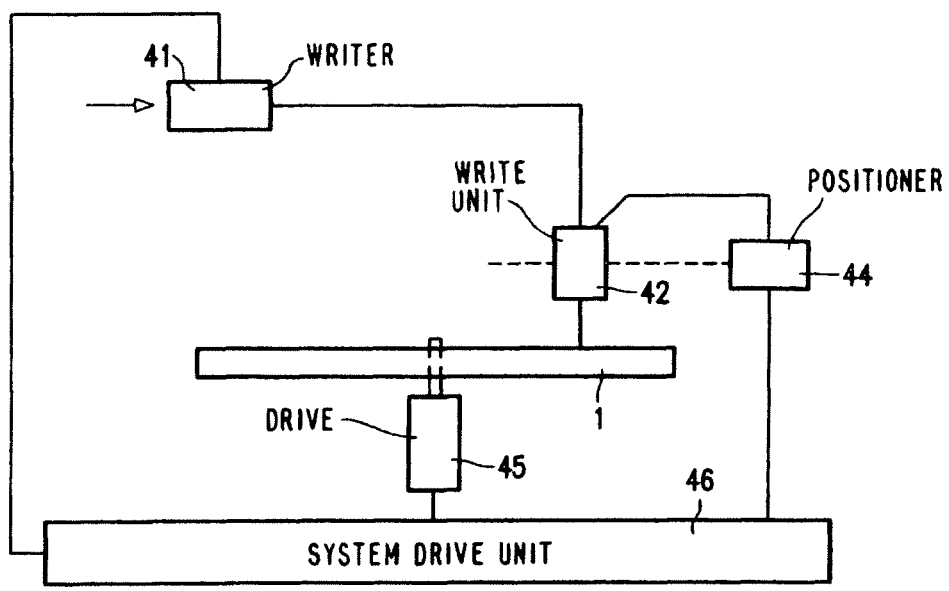
FIG. 4 shows a writing device for writing information blocks.

FIG. 3a shows a partly written record carrier with rewritten information blocks in accordance with an embodiment of the invention. In addition to the written areas 21, 22, 23 shown in FIG. 2, areas 32 and 33 are written contiguously to the initial area 21 after the end 24. The information blocks recorded in the isolated areas 22 and 23 are written once again in the contiguous areas 32 and 33. The sequence of the information blocks written once again can be freely chosen. In the conventional file management systems, the position of the information blocks is indicated in the file management information. In a first embodiment of the invention, the file management information is adapted to the new location of the information blocks in the contiguous areas 32 and 33. This has the advantage that the partly written record carrier can now be read by any standard reading device because all information blocks are now located in the initial area and can thus be approached via an uninterrupted written area. In a practical embodiment, the status information can be adapted by means of a reading/writing device such as a DVD-RAM drive, while the information blocks can be rewritten via a software program in a computer system connected to the DVD-RAM drive. This program can then be taken up in the device driver of the DVD-RAM interface or used as a separate program, for example in the background of a multitasking system. Rewriting can then take place when there are no other writing and/or reading instructions for the DVD-RAM drive. In a further embodiment, the record carrier is provided with additional position information 35 at a predetermined position. This has the advantage that the original file management information remains unchanged. The additional position information then comprises, for example an address translation table for translating the original addresses of the information blocks in the isolated areas 22 and 23 to the new addresses of the rewritten blocks in the contiguous areas 32 and 33. In the case of a reading instruction, a system drive in a reading device can read the address translation table and the status information 25, and if the addresses to be read are outside the initial area 21, an address of the rewritten information block can be searched via the address translation table. In this case, it is an advantage that most information blocks maintain their original address because, normally, the file management system positions the information blocks contiguously from the start. Consequently, only a relatively short address translation table is required. In a practical embodiment, the address translation table can be read and processed in a DVD drive or in the connected computer system via device-driver software installed therein in the conventional manner FIG. 4 shows a device for writing information blocks on a disc-shaped record carrier of a writable type, for example magneto-optically or optically (via phase change) writable via a beam of electromagnetic radiation. During writing, marks representing the information are formed on the record carrier. The device is provided with drive means 45 for rotating the record carrier 1 and a write head 42 for scanning the track which is indicated by the track structure on the record carrier. The device is further provided with a system drive unit 46 for receiving commands from a driving computer system or a user and for driving the device. To this end, the system drive unit comprises, for example a microprocessor, a program memory and driver ports for performing the procedures described hereinafter and for driving said elements. The write head 42 is positioned radially on the track by positioning means 44, detecting position information from the track structure. In accordance with known tracking and focusing methods, the write head scans the track while, for example, a modulation is present in the tracking signal due to the wobble in the pregroove. The tracking signal is demodulated and the position information encoded therein is regained in the positioning means 44 and passed on the system drive unit 46. The radial position of the write head can be verified via the regained position information. The information presented to the input of the write means 41 is divided, if necessary, into information blocks and converted into a write signal for the write head 42. The write means 41 comprise, for example an error encoder and a channel encoder. The system drive unit 46 drives the positioning means 44, the write means 41 and the drive means 45 and is equipped to perform the procedures, to be described hereinafter, for generating the status information.

The system drive unit 46 is adapted to detect whether areas are written and generate corresponding status information. This status information is indicative of the fact whether at least one area of the record carrier is written, the status information comprising initial-area information which is indicative of an uninterrupted written initial area which extends from the start of a track pattern area intended for writing information blocks. This initial area may be read by any standard reading device, because no unwritten areas need to be crossed during positioning. The status information 25 should only be adapted when up to that moment blank, unwritten areas right after the end 24 are written. In a first embodiment, the initial-area information comprises end-address information which is indicative of the position of the end of the initial area. The status information 25 in FIG. 2 then indicates where the end 24 of the initial area 21 is located, for example by means of an address of the last written information block. It is to be noted that it is not important whether the information block actually comprises information which is in use. The end address of the initial area 21 then always indicates the highest, ever written end. Alternatively, the start and the length of the initial area can be fixed, or the status of all relevant areas can be fixed in a bit map. The status of further areas located on the record carrier can be fixed, for example, as intervals in an interval table. When the initial area grows at a given moment in such a way that it will be contiguous to an interval already written, the limit of the initial area can be directly shifted until after this interval. The interval table comprises interval information which is indicative of the position of the start and end of uninterrupted written areas of the track pattern. In another embodiment, the status of all sub-areas is fixed in a bit map. The status information then comprises bit map information which is indicative of written and unwritten areas. In this case, one bit is available for each area of a size to be minimally written in one run, while the bit of a given address on the record carrier indicates the status. This minimal size is dependent on the error correction used which extends across a given quantity of information. For example, in a DVD, the size of an information block is 32 kbyte so that for 1 bit per information block a bit map for 8 Gbytes fits in one information block. Also as an addition to the bit map, a table with written areas can be fixed in which at least the end of the first written area (viewed in the radial direction from the central aperture) is given. Without an analysis of a large number of bits from the bit map, the size of the initial area can be read from this table.

In a first embodiment of the detection, the written state is derived from the received writing instructions and possibly from successfully performed reading instructions. From the moment when the record carrier is introduced into the device, the system drive unit registers which areas are written, for example, by means of a list of addresses or a bit map as described above. In the case of a writing instruction for a given address, the bit corresponding to this address is set to the state which indicates the written state. In a second embodiment, the written state is further detected because the system drive unit reads areas of the record carrier on its own initiative. In another embodiment, the status information is also derived from the file management information present on the record carrier, which information conventionally comprises tables stating whether addressable areas on the record carrier are free or occupied. In this respect it is to be noted that this file management information only indicates the current state, with no information being present about areas written in the past and being meanwhile free again. In contrast, the status information also comprises information about all areas ever written which are meanwhile free again for new data storage. The system drive unit can store the status information of a given record carrier in a memory. Moreover, this stored status information may be provided with an identification of the record carrier so that the status information is available from the memory after the record carrier has been re-inserted into the device.

In an embodiment of the writing device, the system drive unit fixes the status information on the record carrier itself. This has the advantage that the status information is available at each drive in which the record carrier is written. The status information can be fixed at a predetermined position on the record carrier, for example in or preceding the lead-in area where no user information may be stored. Instead, the status information may be fixed as a file for which the rules of the file management system used must be maintained (via Directories and Path Tables). The status information may be stored, for example immediately after a change of the end of the initial area. In one embodiment of the device, fixing on the record carrier is dependent on the operational circumstances. Fixing may be performed, for example when no other writing instructions are available. It is also possible to wait until a command is given to reject the record carrier from the device or to switch off the device. At that moment, the status information must first be fixed. This has the advantage that wear due to repeated fixing can be limited. Fixing can also be postponed so that the status information is not written unnecessarily often but does not trail too much in the case of an unwanted interruption such as current failure. Thus it is possible to wait until at least N areas which have not been written earlier are written since the last fixing procedure. When N is chosen to be, for example 16, at most 15 blocks more are written than the previous status information indicates. In an embodiment of the device, the system drive unit can supplement the fixed status information, when the record carrier is re-inserted into the device, by reading information blocks contiguous to the initial area where at most 15 blocks can follow. Moreover, the device can attempt to read small unwritten areas, for example up to a length of 16 blocks and possibly adapt the status information accordingly. If an uninterrupted area separated into two intervals by such a small area is incorrectly fixed in the status information, the status information can be adapted to one interval. Even if there appears to be a small gap between two written areas, the device may independently write this area with dummy information so that a better uninterrupted division is also obtained.

Figure 3B:
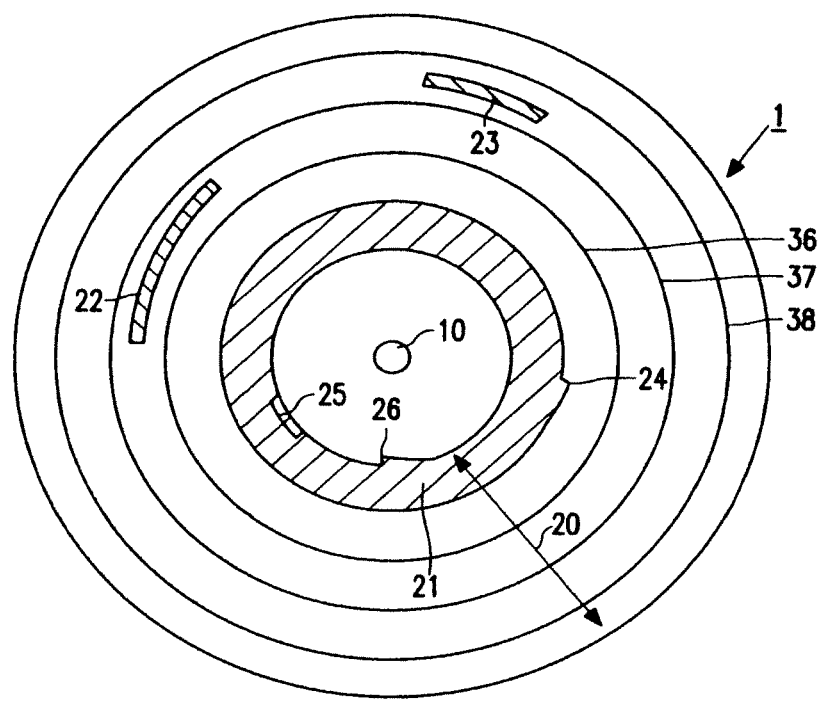

In a further embodiment, the above-mentioned operation is combined in a "paving" procedure. The gaps between the written areas are successively written in the paving procedure described hereinafter by filling all gaps in consecutive work areas from the start of the track. FIG. 3b shows diagrammatically three work areas on the record carrier 1 after the paving procedure has been completed, with the area from the start of the track being entirely written at least up to the radius of the furthest outwardly located information block 23. A first work area extends from the written area 21 to the radius 36 which is located further outwards. Subsequently, a second word area is indicated up to a second further outward radius 37 and a last work area up to a third radius 38. The size of the work areas and hence their number is chosen to be such that a work area can be filled in a limited period of time, for example one minute.

First, the system drive unit searches and reads the location of the track where the initial-area information such as the end address of the uninterrupted written initial area (End of Written Area, EWA) is written. When the record carrier is still completely unwritten or not previously submitted to the paving procedure, this location is still unwritten and the location is initialized by recording the starting values such as, for example EWA=0. Secondly, a work area of a predetermined length just beyond the initial area is read for detecting the status information in this work area. The length may be, for example, 256 or 1024 information blocks and the status of each of these blocks is subsequently known, namely whether they are written or unwritten. When, due to formatting of the information blocks, a given number of blocks should always be jointly written, only the status of such a group needs to be determined. This is the case, for example, when error correction information is determined and written for a joint number of blocks. Moreover, bad sectors and verification can be taken into account. Thirdly, the still unwritten gaps in this work area are filled with dummy information, while areas which have already been written are carefully skipped. Finally, the EWA is adapted to the new situation, whereafter the uninterrupted written initial area is enlarged with the work area. The paving procedure is then repeated for a subsequent work area. Alternatively, the EWA may be adapted after the enlargement with a number of small work areas; this has the advantage that the location of the EWA needs to be rewritten less frequently. It is to be noted that the EWA can be fixed with a resolution in conformity with the minimal work area. Alternatively, the EWA may comprise the address of the block which was actually last written so that a subsequent paving procedure can start from EWA when the EWA value is written as the last value when an eject command breaks off the procedure.

The above-mentioned paving procedure can be performed automatically when the operational circumstances allow this, for example when no external instructions have to be carried out. If another external instruction is presented to the device during processing of the work area, the processing operation may be postponed or broken off completely. After the external instruction has been carried out, the processing operation can be resumed or restarted. In this case, of course the status information within the work area should first be adapted to the situation after the external instruction if, due to this instruction, sectors in the work area have been written. Alternatively, the paving procedure is started by an external instruction, for example a partial finalization command when the user wants to make a DVD-RAM record carrier suitable for use in a DVD-ROM player. In this case, all gaps up to the highest address in use must be written with dummy information. It is advantageous to write also a small area beyond the highest address in use so that a DVD-ROM player which jumps a bit too far upon a jump to this address does not land in an unwritten area. The highest address in use may be derived, for example from the file management information or passed along with the finalization command. The successive filling of all gaps may be effected, for example in the manner described hereinbefore by repeatedly processing work areas until the highest address in use is reached. Another full finalization command may indicate that the complete record carrier is to be written up to the limit of the area intended for storing information.

In a further embodiment, the status information comprises the value of the Last Used Block (LUB) which is fixed at a location on the record carrier, for example, together with the EWA. During a writing instruction with a higher address than the LUB, this LUB is to be adapted. It is then advantageous to rewrite the LUB before performing the writing instruction so that, in the case of current failure, the correct value for the LUB is present on the record carrier directly after performing the writing instruction. This causes some loss of performance because it is necessary to write at two locations in the case of such writing instructions, which locations will be far apart from each other on the record carrier. In fact, the LUB will be fixed close to the start of the track and, in contrast, the new information block to be written is far remote from the start of the track. It is advantageous to fix only an indication of the Last Used Zone (LUZ) instead of the exact address of the Last Used Block, which zones may be as large as the work areas of the finalization procedure. The performance loss is now considerably limited because the LUZ only needs to be written once per zone when an information block must be written for the first time in a zone which is located further outwards.

A further advantage is that the paving or finalization procedure as such does not need to be fixed in a standard, except for the location of the EWA on the record carrier. In fact, it is not necessary that each device knows such a paving procedure and performs it in exactly the same way (for example, with a given size of the work areas), because the current situation of the area just beyond the EWA is always read first when performing the procedure. This precludes the risk that areas which comprise information are overwritten inadvertently.

In a further embodiment, several locations are reserved for status information to be written on the record carrier. For predictably changing parameters, such as EWA or LUZ, each new value will be higher than the previous value. The new value is now fixed in a subsequent location, while the first value is re-used after use of the last value. During reading, all locations are read and the highest value is determined, i.e. the last written and, consequently, valid value. This has the advantage that wear due to repeated writing of one location is now limited by the spread across all reserved locations. Alternatively, an (ascending) serial number can be written for a parameter to be written, by which the last fixed and hence valid parameter is known.

Dependent on the chosen way of fixing the status information, the system drive knows the location of the status information or a reference to the status information, or it uses the file management information in known manner so as to reproduce the status information. The status information may be fixed at a predetermined position on the record carrier, for example in or preceding the lead-in area where no user information may be stored. In contrast, another suitable position is near the end of the area intended for data storage because, globally, the record carrier will be filled from the start. When the area near the end is necessary for data storage when the record carrier has almost completely been filled, the status information will be limited to a small quantity or may be canceled entirely because then there are (virtually) no unwritten areas left. Instead, the status information can be fixed as a file. In another embodiment, for example extra validity information in the status information may be stored on the record carrier. For performing a first writing instruction, the device writes the validity information on the record carrier, indicating that the record carrier can comprise more written areas and/or areas which are in use than the status on this record carrier indicates. If the operational circumstances permit this, a new version of the status is fixed, whereafter the validity information is fixed again as the last information but now with the contents that the status is completely up to date. If the session is interrupted in the meantime, for example, due to current failure or manual removal of the record carrier, the validity information on the record carrier indicates that the status information is incomplete.

A further embodiment of the writing device is provided with rewriting means for rewriting, contiguously to the initial area, information blocks which are isolated from the initial area, as described with reference to FIG. 3a. To this end, the system drive unit 46 is adapted to detect isolated areas. Subsequently, the system drive unit will read the block and write it once again, contiguously to the initial area but of course with an adaptation of the initial-area information in the status information. Moreover, the system drive unit is suitable for adapting the file management information or for taking up the original address and the address after rewriting in an address translation table. In the case of a reading instruction from a driving computer system, the original address will be derived from the file management information. The system drive unit will then translate this presented original address into a physical address within the initial area via the address translation table. In another embodiment, this translation can take place in the driving computer itself, which translation is then realized by means of a software implementation, for example in device driver software. During rewriting, areas which are not written yet are preferably used so that a maximal part of the record carrier is written and is therefore accessible to a standard reading device. If, at a later instant, an area in which a copy is written via the file management information is put into use, the information block rewritten in this area should be rewritten again in an unwritten area located at a further position but of course with a corresponding adaptation of the status information. The system drive unit is adapted for this purpose and checks, in the case of writing instructions in the initial area, whether an area used for rewriting must be written. In that case, a new rewriting procedure is initiated, which proceeds in the manner described previously with reference to FIG. 3a in rewriting newly written isolated areas.

The temporary status information which has not been fixed yet is preferably stored in a non-volatile memory in the writing device so that, after termination of a current failure, the temporary status information can as yet be fixed. In another embodiment, it can be fixed in the status information that the record carrier does not fully comply with the requirements of a reading device, for example when it is "partly ROM drive prepared" and possibly a list of information blocks to be rewritten can be added. Moreover, a record carrier in which no areas are isolated because all isolated areas are rewritten can be marked as such with "fully ROM drive prepared". Furthermore, status information can be doubly fixed during storage so as to have a reserve copy of these important data in the case of damage of the first storage area.

Figure 5:
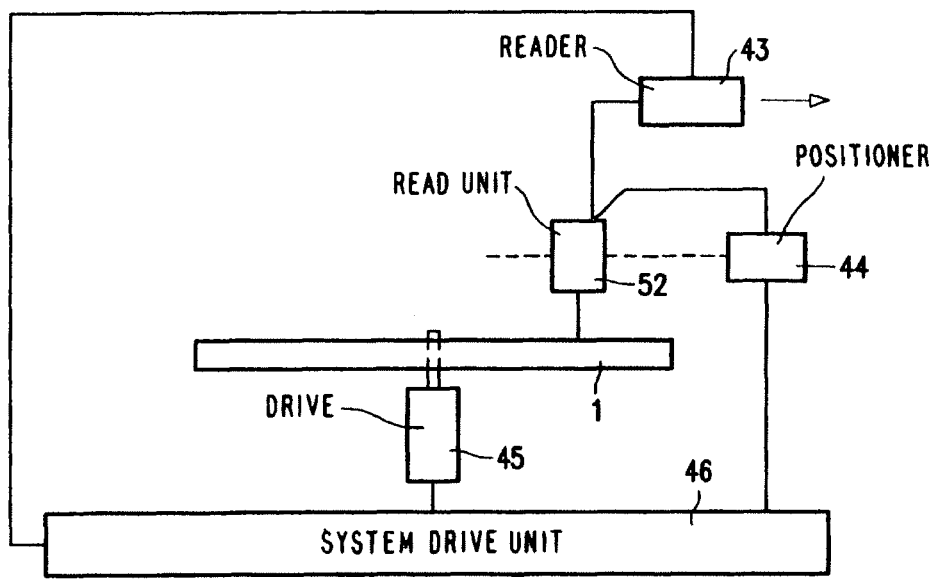
FIG. 5 shows a reading device.

FIG. 5 shows a reading device according to the invention for reading information blocks. The reading device is provided with drive means 45 for rotating the disc-shaped record carrier 1 and a read head 52 for scanning the track on the record carrier. The read head 52 is positioned radially on the track by positioning means 44 on the basis of signals derived from marks on the record carrier. In accordance with the conventional Differential Phase Detection or Differential Time Detection system (DPD or DTD), for example, the reflected radiation on a detector (not shown) can be collected, which detector is subdivided into 4 sub-detectors. By determining phase or time differences between the signals of the sub-detectors, the position of the scanning spot with respect to the series of marks written in the track can be determined. In this respect it may be noted that such a device intended for reading Read-Only record carriers such as, for example DVD-ROM will not be provided with means for deriving tracking and/or position information from a track structure on a writable record carrier. During reading, the signal of the read head 52 is converted into the information in the read means 43, for example comprising a channel decoder and an error corrector. Moreover, the device is provided with a system drive unit 46 which, inter alia, on the basis of a read command, will displace the read head 52 to a radial position which is located a short distance before the area to be read (coarse positioning), and subsequently the system drive unit will derive the current position via the read head 52 and the positioning means 44 from position information read from the record carrier and subsequently (fine-)position the read head on the basis of the position information. In the reading device according to the invention, the positioning means are adapted to position in dependence upon the status information. When performing a jump, the positioning means will then always position the read head above a written part of the record carrier and then fine-position it via a written area, if necessary, in a movement opposite to the direction of the jump. In an embodiment of the reading device according to the invention, the positioning means are adapted to reject instructions for positioning outside the initial area. This has the advantage that the driving computer knows which instructions cannot be carried out and possibly also why not via an error code in the rejection. Then, the reading device cannot come in an undefined state due to, for example an endless search for marks in an unwritten area. In a further embodiment of the reading device, the system drive unit 46 is adapted to translate the original addresses from reading instructions to the physical addresses of the rewritten information blocks via the translation table, as described hereinbefore. The original address has then been determined from, for example the file management information. If the original address is located in the initial area, the information block has not been rewritten. Consequently, the translation only needs to take place if the original address is indicative of a position outside the initial area. In practice, the greater part of the information blocks will be located in the initial area. This has the advantage that no translation is needed for a large number of reading instructions.

Figure 6:
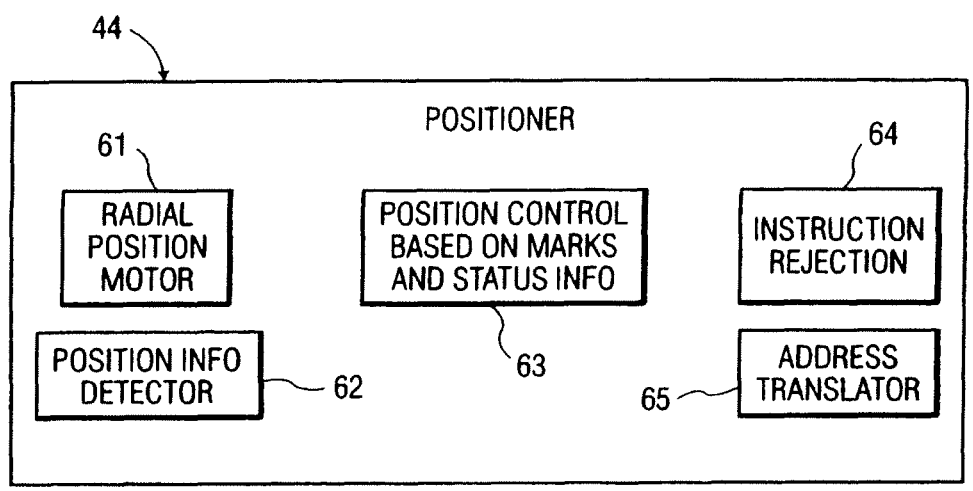
Figure 7:
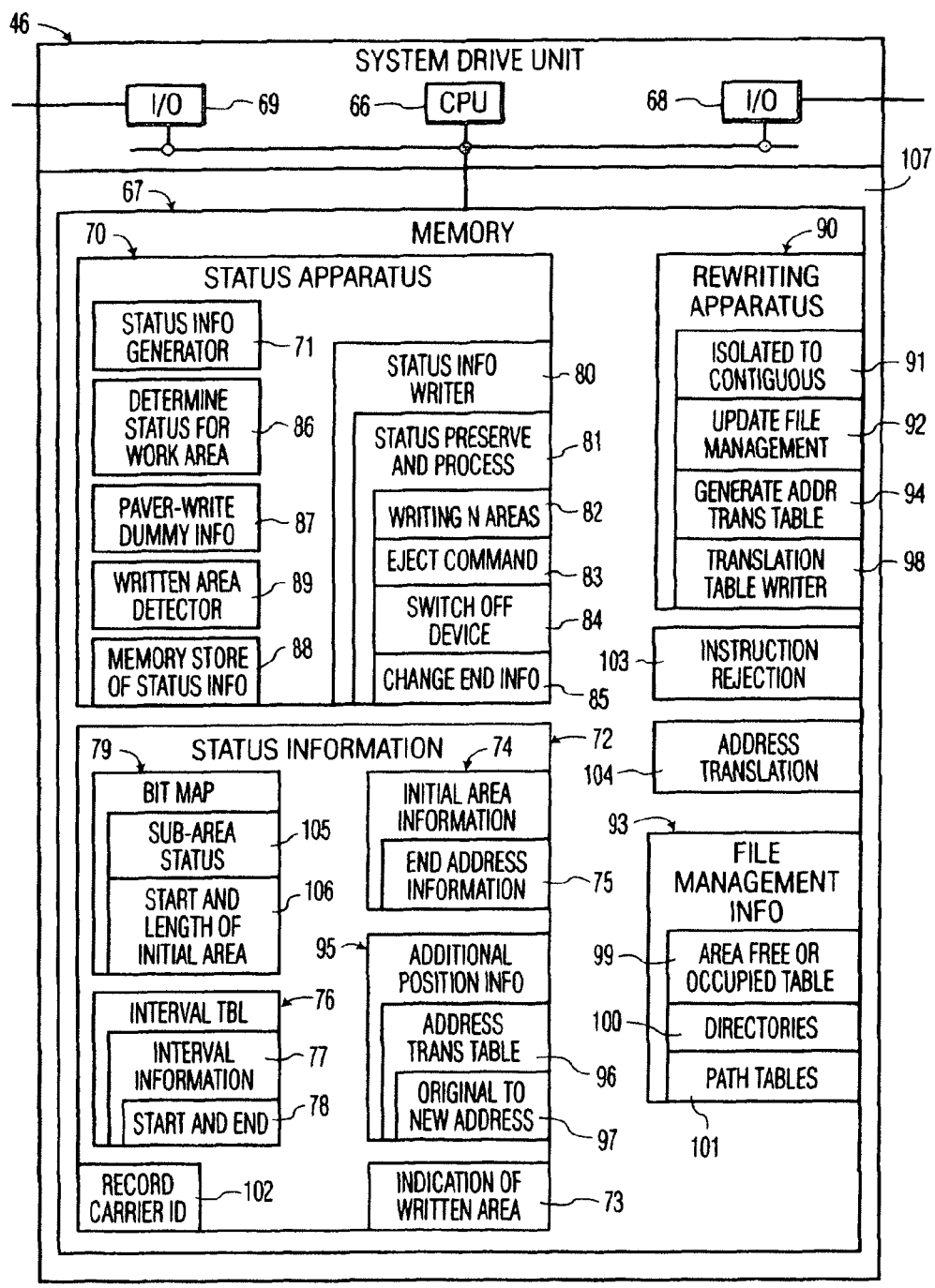

FIGS. 6 and 7 shows positioner 44 and system drive unit 46 of FIGS. 4 and 5 in more detail. The purpose of this figure is to illustrate the claimed apparatus and is not required for an understanding of the invention. The apparatus and relationships shown in this figure has been previously described in this specification, in relation to a specific embodiment of the invention, thus this portion of the description will only briefly identify the apparatus.

In FIG. 6, positioner 44 includes apparatus 61 for positioning the read and write units; apparatus 62 for detecting position information on the record carrier; apparatus 63 for controlling the position based on the marks on the record carrier and on the status information; and apparatus 64 for rejecting instructions to read and/or write data outside of the initial area. The positioner also includes an address translator for translating a first address of an information block in accordance with file management information into a second address in the initial area. This allows reading from and/or writing to blocks of information which have been rewritten to copy the blocks to a position contiguous with the initial area.

In FIG. 7, the system drive unit 46 includes a microprocessor 66, programmable memory 67 and ports 68 and 69 for receiving information and providing control signals and information. Memory 67 includes programmed apparatus for controlling the operation of CPU 65 and a copy of information that has been read or will be written to the record carrier, and other information required for operations. Programmed status apparatus 70 includes apparatus 71 for generating status information 72 including an indication 73 that at least one area of the record carrier has been written and initial-area information 74 including end-address information 75 indicating the position of the end of the initial area. The status information also includes an interval table 76 with interval information 77 including information 78 indicating the start and end of uninterrupted written areas. The status information also includes bit-map information 79 defining written and unwritten areas and including sub-area status information 105 and indication 106 of the start and length of initial area.

Status apparatus 70 includes apparatus 80 to write status information 73 onto the respective record carrier, and apparatus 81 to preserve and process the status information and write the status information to the respective record carrier depending on operational circumstances including: apparatus 82 for fixing the status information when at least N areas have been written since the last such fixing; apparatus 83 for writing the status information when an eject command is received for the respective record carrier; apparatus 84 for writing the status information when a command to turn off the device is received; and apparatus 85 for writing the status information when the end of the initial area changes. The status apparatus also includes apparatus 86 to determine the status information for a work area contiguous with the initial area, and apparatus 87 for paving work areas (i.e. unwritten parts contiguous with the initial area) with information to allow reliable tracking by writing into such work areas with dummy information. Finally the status apparatus includes apparatus 88 for maintaining a copy of the status information in memory, and apparatus 89 for detecting written areas.

Memory 67 also includes programmed rewriting apparatus 90 including apparatus 91 for rewriting to copy information blocks which are isolated from the initial area to a position contiguous with the initial area. Rewriting apparatus 90 further includes: apparatus 92 for updating the file management information 93 to indicate the new location of information on the record carrier when areas are rewritten; apparatus 94 for generating additional position information 95 including an address translation table 96 with information 97 for translating a first address of information blocks outside the initial area to a second address of information blocks within the initial area, such as the original address of isolated blocks to the new address of rewritten blocks; and apparatus 98 for writing the address translation table to the respective record carrier. File management information 93 includes: a table 99 indicating which areas are free and which areas are written; directories 100; and path tables 101. The status information also includes a record carrier identification 102 so that multiple record carriers may be used in the system.

The system of the invention may include an instruction rejection apparatus 103 for rejecting instructions to read and/or write to the area outside of the initial area to keep the system from going into an undefined state. The instruction rejection apparatus may be located in the system drive unit as shown, or in the positioner as shown in FIG. 6, or in another portion of the system. In this specific embodiment, the system also includes apparatus 104 which uses the information in address translation table 96, for translating an original address of information blocks according to the file management information that are isolated from the initial area into a new address of information blocks copied to a position contiguous with the initial area.

Memory 67 may be dynamic random access memory or non-volatile memory. The above specific embodiment with programmed devices may be implemented by reading programs and information from the record carrier 1 through ports 68 or 69, into memory 67. Alternatively the devices may be implemented by connecting a memory component 107 to communicate with CPU 66 such as by inserting a memory cartridge into a slot or a non-volatile memory package into a socket.

The reading and/or writing device of the invention may include a programmable computer system or computer network.

Figure 8:
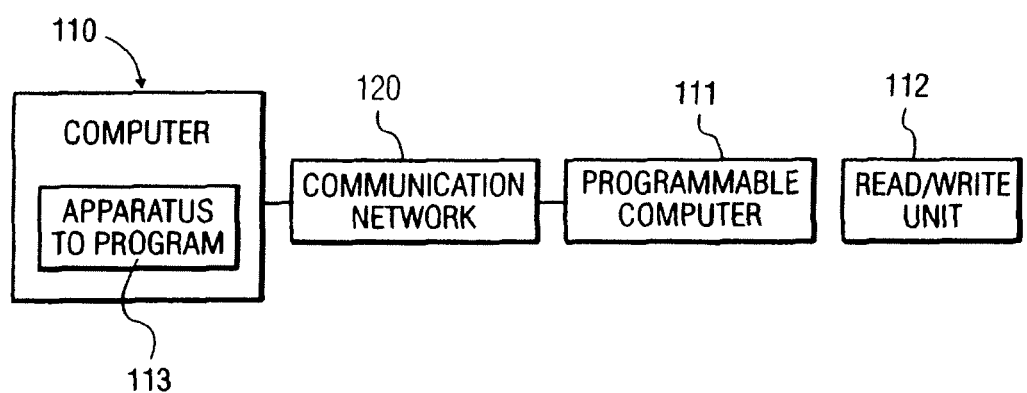

FIG. 8 shows computer system 110 and programmable computer system 111 with a read and/or write unit 112, a read unit 113 and a positioner 114. communicating through a communications network 112. Computer 110 includes apparatus 113 for programming computer 111 for implementing the inventions of this application. Computer 110 generates signals transferred through communication network 114 to the programmable computer 111 to provide the programmed apparatus of the invention. Thus if the read or write unit is subsequently connected to computer 112, then the read device and/or write device of the invention will be implemented, and the method of the invention practiced.

The invention has been disclosed with reference to specific preferred embodiments, to enable those skilled in the art to make and use the invention, and to describe the best mode contemplated for carrying out the invention. Those skilled in the art may modify or add to these embodiments or provide other embodiments without departing from the spirit of the invention. Thus, the scope of the invention is only limited by the following claims The invention may also be used for Write Once record carriers, such as CD-R or DVD-R. With the paving procedure described above, a partly written DVD-R may be rendered suitable for use in other reading devices by filling up the unwritten areas with dummy information. In such a record carrier, the paving or finalization procedure should of course only be started after an external command which may be given by the user if he does not want to store further information on the DVD-R. Parameters which are indicative of the written state, such as EWA, can be stored in a memory in the device during the procedure and/or after completion in the next free location of a series of locations reserved for this purpose on the Write Once record carrier.

The invention claimed is:

1. A device for writing information blocks in a track pattern on a record carrier of a writable type, which device is provided with a write unit for writing areas of the record carrier via a beam of electromagnetic radiation with marks representing the information blocks, and positioning means for positioning the write unit on the record carrier on the basis of a track structure which indicates the track pattern, wherein the device is provided with status means for generating status information which indicates that at least one area of the record carrier has been written, the status information comprising initial-area information which indicates an uninterrupted written initial area.

2. A device as claimed in claim 1, wherein the initial-area information comprises end-address information which indicates the position of the end of the initial area.

3. A device as claimed in claim 1, wherein the status information comprises interval information which indicates the position of the start and the end of an uninterrupted written area of the track pattern.

4. A device as claimed in claim 1, wherein the status information comprises bit map information which indicates written and unwritten areas.

5. A device as claimed in claim 1, wherein the status means are adapted to fix the status information on the record carrier.

6. A device as claimed in claim 5, wherein the status means are adapted to preserve and process the status information during a period and to fix said information after the period in dependence upon operational circumstances.

7. A device as claimed in claim 6, wherein the operational circumstances comprise writing of at least N areas not previously written since fixing the last information, a command to eject the record carrier from the device or a command to switch off the device.

8. A device as claimed in claim 1, wherein the status means are adapted to determine the status information in a work area contiguous to the initial area and to write the unwritten parts of the work area with dummy information.

9. A device as claimed in claim 1, wherein the device is provided with rewriting means for rewriting, contiguously to the initial area, information blocks which are isolated from the initial area.

10. A device as claimed in claim 9, wherein the rewriting means are arranged to adapt file management information indicating the position of the information blocks on the record carrier to the position of the rewritten information blocks.

11. A device as claimed in claim 9, wherein the rewriting means are adapted to generate an address translation table on the record carrier, which address translation table comprises information for translating the original address of rewritten information blocks into the address after the rewriting operation.

12. A writable record carrier having a track pattern for writing information blocks, and a track structure that indicates the position of the track pattern, wherein the record carrier is provided with status information which indicates the fact that at least one area of the record carrier has been written, the status information comprising initial-area information which indicates an uninterrupted written initial area.

13. A record carrier as claimed in claim 12, wherein the status information comprises an address translation table which comprises information for translating a first address of information blocks in accordance with file management information into a second address in the initial area.

14. A method of writing information blocks in a track pattern on a record carrier of a writable type, in which method marks representing the information blocks are written in areas of the record carrier via a write unit and a beam of electromagnetic radiation, the write unit being positioned on the basis of a track structure which indicates the position of the track pattern, wherein status information is generated which indicates the fact that at least one area of the record carrier has been written, the status information comprising initial-area information which indicates the position of an uninterrupted written initial area.

15. A reading device comprising: read means for reading information blocks represented by optically readable marks in a track pattern on a record carrier, a read unit for reading the marks via a beam of electromagnetic radiation, and positioning means for positioning the read unit on the basis of the marks, wherein the positioning means are adapted to position depending on status information which indicates that at least one area of the record carrier has been written, the status information comprising initial-area information which indicates the position of an uninterrupted written initial area.

16. A reading device as claimed in claim 15, wherein the positioning means are adapted to reject instructions for positioning outside the initial area.

17. A reading device as claimed in claim 15, wherein the reading device is provided with translation means for translating, in dependence upon an address translation table, a first address of information blocks in accordance with file management information into a second address in the initial area, in case the first address indicates a position outside the initial area.

18. The device of claim 1 wherein the uninterrupted written area extends from the start of a track pattern area for writing information blocks.

19. The record carrier of claim 12 wherein the uninterrupted written area extends from the start of a track pattern area for writing information blocks.

20. The method of claim 14 wherein the uninterrupted written area extends from the start of a track pattern area for writing information blocks.

21. The reading device of claim 15 wherein the uninterrupted written area extends from the start of a track pattern area for writing information blocks.

22. A device for writing information blocks in a track pattern on a record carrier of a writable type, the device comprising:
　　a write unit for writing areas of the record carrier via a beam of electromagnetic radiation with marks representing the information blocks,
　　positioning means for positioning the write unit on the record carrier on the basis of a track structure which indicates the track pattern, status means for generating status information which indicates that at least one area of the record carrier has been written, the status information comprising initial-area information which indicates an uninterrupted written initial area which extends from the start of a track pattern area for writing information blocks, the status means are for determining the status information in a work area contiguous to the initial area and to write the unwritten parts of the work area with dummy information.

23. The device of claim 22, wherein the initial-area information comprises end-address information for indicating the position of the end of the initial area.

24. The device of claim 22, wherein the status information comprises interval information for indicating the position of the start and the end of an uninterrupted written area of the track pattern.

25. The device of claim 22, wherein the status information comprises bit map information for indicating written and unwritten areas.

26. The device of claim 22, wherein the status means fixing the status information on the record carrier.

27. The device of claim 26, wherein the status means are for preserving and processing the status information during a period and to fix said information after the period depending upon operational circumstances.

28. The device of claim 27, wherein the operational circumstances comprise one of more of: writing of at least one areas not previously written since fixing the last information, a command to eject the record carrier from the device, and a command to switch off the device.

29. The device of claim 22, comprising rewriting means for rewriting, contiguously to the initial area, information blocks which are isolated from the initial area.

30. The device of claim 29, wherein rewriting means are for adopting file management information indicating the position of the information blocks on the record carrier to the position of the rewritten information blocks.

31. The device of claim 29, wherein the rewriting means are for generating an address translation table on the record carrier, which address translation table comprises information for translating the original address of rewritten information blocks into the address after the rewriting information.

32. A writable record carrier having track pattern for writing information blocks, and a track structure which indicates the track pattern, said record carrier comprising:
status information which indicates that at least one area of the record carrier has been written, the status information comprising initial-area information which indicates an uninterrupted written initial area which extends from the start of a track pattern area for writing information blocks,
the status information comprising interval information indicating the position of the start and the end of uninterrupted written areas of the track pattern.

33. The record carrier of claim 32, wherein the status information comprises bit map information for indicating written and unwritten areas.

34. The record carrier of claim 32, wherein the status information comprises an address translation table which comprises information for translating a first address of information blocks in accordance with file management information into a second address in the initial area.

35. A method of writing information blocks in a track pattern on a record carrier of a writable type, in which method marks representing the information blocks are written in areas of the record carrier via a write unit and a beam of electromagnetic radiation, the write unit being positioned on the basis of a track structure which indicates the track pattern, said method comprising the acts of:
generating status information which indicates that at least one area of the record carrier has been written, the status information comprising initial-area information which indicates an uninterrupted written initial area which extends from the start of a track pattern area intended for writing information blocks;
determining the status information in a work area contiguous to the initial area;
writing the unwritten parts of the work area with dummy information.

36. The method of claim 35, wherein the step of generating the status information comprises a sub-step of generating bit map information for indicating written and unwritten areas.

37. A reading device provided with read means for reading information blocks represented by optically readable marks in a track pattern on a record carrier, said reading device comprising:
a read unit for reading the marks via a beam of electromagnetic radiation,
positioning means for positioning the read unit on the basis of the marks depending upon status information which indicates that at least one area of the record carrier has been written, the status information comprising initial-area information which indicates an uninterrupted written initial area which extends from the start of a track pattern area for writing information blocks wherein the positioning means are for rejecting instructions for positioning outside the initial area.

38. The reading device of claim 37, comprising:
translation means for translating, depending upon an address translation table, a first address of information blocks in accordance with file management information into a second address in the initial area, in case the first address indicates a position outside the initial area.

39. A device for writing information blocks in a track pattern on a record carrier of a writable type, which device is provided with a write unit for writing ares of the record carrier via a beam of electromagnetic radiation with marks representing the information blocks, and positioning means for positioning the write unit on the record carrier on the basis of a track structure which indicates the track pattern, wherein the device is provided with status means for generating status information which indicates that at least one area of the record carrier has been written, the status information comprising initial-area information which indicates an uninterrupted written initial area, wherein the status means are adapted to determine the status information in a work area contiguous to the initial area and to write the unwritten parts of the work area with dummy information.

40. A device for writing information blocks in a track pattern on a record carrier of a writable type, which device is provided with a write unit for writing areas of the record carrier via a beam of electromagnetic radiation with marks representing the information blocks, and positioning means for positioning the write unit on the record carrier on the basis of a track structure which indicates the track pattern, wherein the device is provided with status means for generating status information which indicates that at least one area of the record carrier has been written, the status information comprising intial-area information which indicated an uninterrupted written initial area, wherein the sequence in which the device writes information blocks on the record carrier may be freely chosen.

* * * * *